US011694276B1

(12) United States Patent
Gil et al.

(10) Patent No.: US 11,694,276 B1
(45) Date of Patent: Jul. 4, 2023

(54) PROCESS FOR AUTOMATICALLY MATCHING DATASETS

(71) Applicant: Bottomline Technologies, Inc., Portsmouth, NH (US)

(72) Inventors: Leonardo Gil, Manchester, NH (US); Peter Cousins, Rye, NH (US)

(73) Assignee: Bottomline Technologies, Inc., Portsmouth, NH (US)

(*) Notice: Subject to any disclaimer, the term of this patent is extended or adjusted under 35 U.S.C. 154(b) by 0 days.

(21) Appl. No.: 17/459,170

(22) Filed: Aug. 27, 2021

(51) Int. Cl.
*G06Q 40/12* (2023.01)
*G06Q 30/04* (2012.01)
*G06F 16/2457* (2019.01)

(52) U.S. Cl.
CPC ....... *G06Q 40/12* (2013.12); *G06F 16/24578* (2019.01); *G06Q 30/04* (2013.01)

(58) Field of Classification Search
None
See application file for complete search history.

(56) References Cited

U.S. PATENT DOCUMENTS

| | | |
|---|---|---|
| 4,575,793 A | 3/1986 | Morel et al. |
| 5,228,122 A | 7/1993 | Cahn et al. |
| 5,559,961 A | 9/1996 | Blonder |
| 5,600,735 A | 2/1997 | Seybold |
| 5,600,835 A | 2/1997 | Garland et al. |
| 5,634,008 A | 5/1997 | Gaffaney et al. |

(Continued)

FOREIGN PATENT DOCUMENTS

| | | |
|---|---|---|
| EP | 1211865 A2 | 6/2002 |
| EP | 1706960 A1 | 10/2006 |

(Continued)

OTHER PUBLICATIONS

Appaloosa Store, "String Similarity Algorithms Compared", Apr. 5, 2018, webpage downloaded on Oct. 20, 2020 from https://medium.com/@appaloosastore/string-similarity-algorithms-compared-3f7b4d12f0ff.

(Continued)

*Primary Examiner* — Fateh M Obaid
(74) *Attorney, Agent, or Firm* — Richard A. Baker, Jr.

(57) ABSTRACT

This document describes a non-transitory computer readable media programmed to enrich an entered record submitted to be matched with a dataset record stored on a data storage device. The enrichment is done by supplementing data in the entered record with customer data from a dataset. The media is further programmed to search through a plurality of dataset records in the dataset for the entered record. The search is programmed to first determine if the entered record unambiguously matches one of the dataset records or if the entered record unambiguously does not match one of the dataset records. If the entered record does not unambiguously match one of the dataset records, score match characteristics using a Fellegi-Sunter algorithm, save the score as a highest score if the score is above the highest score less a threshold, and save a location of one of the dataset records as a matching record if the score is above a previous highest score. Next, tune a Fellegi-Sunter algorithm parameter with the data from the entered record and data from one of the dataset records; and when the dataset records have been checked, return the matching record.

20 Claims, 6 Drawing Sheets

(56) References Cited

U.S. PATENT DOCUMENTS

| | | |
|---|---|---|
| 5,644,717 A | 7/1997 | Clark |
| 5,790,798 A | 8/1998 | Beckett et al. |
| 5,845,369 A | 12/1998 | Dunchock |
| 5,912,669 A | 6/1999 | Hsia |
| 5,961,592 A | 10/1999 | Hsia |
| 5,970,482 A | 10/1999 | Pham et al. |
| 6,044,401 A | 3/2000 | Harvey |
| 6,192,411 B1 | 2/2001 | Chan et al. |
| 6,195,452 B1 | 2/2001 | Royer |
| 6,205,416 B1 | 3/2001 | Butts et al. |
| 6,256,737 B1 | 7/2001 | Bianco et al. |
| 6,523,016 B1 | 2/2003 | Michalski |
| 6,651,099 B1 | 11/2003 | Dietz et al. |
| 6,675,164 B2 | 1/2004 | Kamath et al. |
| 6,687,693 B2 | 2/2004 | Cereghini et al. |
| 6,708,163 B1 | 3/2004 | Kargupta et al. |
| 6,801,190 B1 | 10/2004 | Robinson et al. |
| 6,845,369 B1 | 1/2005 | Rodenburg |
| 6,968,335 B2 * | 11/2005 | Bayliss ............... G06F 16/2471 |
| 7,044,365 B2 | 5/2006 | Witherspoon |
| 7,092,941 B1 | 8/2006 | Campos |
| 7,174,462 B2 | 2/2007 | Pering et al. |
| 7,308,436 B2 | 12/2007 | Bala et al. |
| 7,415,509 B1 | 8/2008 | Kaltenmark et al. |
| 7,584,128 B2 | 9/2009 | Mason et al. |
| 7,702,631 B1 * | 4/2010 | Basu ............... G06F 16/24556 |
| | | 707/999.006 |
| 7,716,129 B1 | 5/2010 | Tan et al. |
| 7,726,561 B2 | 6/2010 | Katyal et al. |
| 7,729,959 B1 | 6/2010 | Wells et al. |
| 7,730,521 B1 | 6/2010 | Thesayi et al. |
| 7,822,598 B2 | 10/2010 | Carus et al. |
| 7,831,703 B2 | 11/2010 | Krelbaum et al. |
| 7,860,783 B2 | 12/2010 | Yang et al. |
| 7,970,669 B1 | 6/2011 | Santos |
| 7,992,202 B2 | 8/2011 | Won et al. |
| 8,229,875 B2 | 7/2012 | Roychowdhury |
| 8,229,876 B2 | 7/2012 | Roychowdhury |
| 8,392,975 B1 | 3/2013 | Raghunath |
| 8,401,867 B2 | 3/2013 | Lagadec et al. |
| 8,429,745 B1 | 4/2013 | Casaburi et al. |
| 8,433,791 B2 | 4/2013 | Krelbaum et al. |
| 8,484,168 B2 * | 7/2013 | Bayliss ................. G06F 16/35 |
| | | 707/688 |
| 8,515,862 B2 | 8/2013 | Zhang et al. |
| 8,538,124 B1 | 9/2013 | Harpel et al. |
| 8,638,939 B1 | 1/2014 | Casey et al. |
| 8,650,624 B2 | 2/2014 | Griffin et al. |
| 8,776,213 B2 | 7/2014 | McLaughlin et al. |
| 8,844,059 B1 | 9/2014 | Manmohan |
| 8,881,005 B2 | 11/2014 | Al et al. |
| 9,015,036 B2 | 4/2015 | Karov et al. |
| 9,189,505 B2 * | 11/2015 | Bayliss ............. G06F 16/24578 |
| 9,449,346 B1 | 9/2016 | Hockey et al. |
| 9,489,627 B2 | 11/2016 | Bala |
| 9,529,678 B2 | 12/2016 | Krelbaum et al. |
| 9,537,848 B2 | 1/2017 | McLaughlin et al. |
| 9,595,023 B1 | 3/2017 | Hockey et al. |
| 9,607,103 B2 | 3/2017 | Anderson |
| 9,667,609 B2 | 5/2017 | McLaughlin et al. |
| 9,691,085 B2 | 6/2017 | Scheidelman |
| 9,798,984 B2 | 10/2017 | Paleja et al. |
| 9,811,650 B2 | 11/2017 | Todeschini |
| 10,037,533 B2 | 7/2018 | Caldera |
| 10,152,680 B1 | 12/2018 | Myrick et al. |
| 10,235,356 B2 | 3/2019 | Amend et al. |
| 10,242,258 B2 | 3/2019 | Guo et al. |
| 10,319,029 B1 | 6/2019 | Hockey et al. |
| 10,320,800 B2 | 6/2019 | Guo et al. |
| 10,402,817 B1 | 9/2019 | Benkreira et al. |
| 10,414,197 B2 | 9/2019 | Jesurum |
| 10,440,015 B1 | 10/2019 | Pham et al. |
| 10,467,631 B2 | 11/2019 | Dhurandhar et al. |
| 10,510,083 B1 | 12/2019 | Vukich et al. |
| 10,511,605 B2 | 12/2019 | Ramberg et al. |
| 10,523,681 B1 | 12/2019 | Bulgakov et al. |
| 10,540,491 B1 | 1/2020 | Martinez et al. |
| 10,552,837 B2 | 2/2020 | Jia et al. |
| 10,552,841 B1 | 2/2020 | Dixit |
| 10,586,220 B2 | 3/2020 | Adams et al. |
| 10,607,008 B2 | 3/2020 | Byrne et al. |
| 10,607,228 B2 | 3/2020 | Gai et al. |
| 10,607,230 B2 | 3/2020 | Adams et al. |
| 10,621,587 B2 | 4/2020 | Binns et al. |
| 10,699,075 B2 | 6/2020 | Amend et al. |
| 10,824,809 B2 | 11/2020 | Kutsch et al. |
| 10,909,511 B2 | 2/2021 | Chanyontpatanakul |
| 10,929,851 B2 | 2/2021 | Kang et al. |
| 11,042,555 B1 | 6/2021 | Kane et al. |
| 2002/0019945 A1 | 2/2002 | Houston et al. |
| 2002/0056043 A1 | 5/2002 | Glass |
| 2002/0065938 A1 | 5/2002 | Jungck et al. |
| 2002/0080123 A1 | 6/2002 | Kennedy et al. |
| 2002/0099649 A1 | 7/2002 | Lee et al. |
| 2002/0163934 A1 | 11/2002 | Moore et al. |
| 2003/0041042 A1 | 2/2003 | Cohen et al. |
| 2003/0083764 A1 | 5/2003 | Hong |
| 2003/0110394 A1 | 6/2003 | Sharp et al. |
| 2003/0135612 A1 | 7/2003 | Huntington et al. |
| 2003/0233305 A1 | 12/2003 | Solomon |
| 2004/0034666 A1 | 2/2004 | Chen |
| 2004/0186882 A1 | 9/2004 | Ting |
| 2004/0193512 A1 | 9/2004 | Gobin et al. |
| 2005/0021650 A1 | 1/2005 | Gusler et al. |
| 2005/0081158 A1 | 4/2005 | Hwang |
| 2005/0154692 A1 | 7/2005 | Jacobsen et al. |
| 2005/0177483 A1 * | 8/2005 | Napier .................. G06Q 40/00 |
| | | 705/35 |
| 2006/0101048 A1 | 5/2006 | Mazzagatti et al. |
| 2006/0155751 A1 | 7/2006 | Geshwind et al. |
| 2006/0190310 A1 | 8/2006 | Gudla et al. |
| 2006/0212270 A1 | 9/2006 | Shiu et al. |
| 2007/0100749 A1 | 5/2007 | Bachu et al. |
| 2007/0277224 A1 | 11/2007 | Osborn et al. |
| 2008/0104007 A1 | 5/2008 | Bala |
| 2009/0059793 A1 | 3/2009 | Greenberg |
| 2009/0094677 A1 | 4/2009 | Pietraszek et al. |
| 2009/0140838 A1 | 6/2009 | Newman et al. |
| 2009/0174667 A1 | 7/2009 | Kocienda et al. |
| 2009/0201257 A1 | 8/2009 | Saitoh et al. |
| 2009/0202153 A1 | 8/2009 | Cortopassi et al. |
| 2009/0282039 A1 * | 11/2009 | Diamond .............. H04L 9/3066 |
| 2009/0307176 A1 | 12/2009 | Jeong et al. |
| 2009/0313693 A1 | 12/2009 | Rogers |
| 2010/0066540 A1 | 3/2010 | Theobald et al. |
| 2010/0130181 A1 | 5/2010 | Won |
| 2010/0169958 A1 | 7/2010 | Werner et al. |
| 2010/0185615 A1 | 7/2010 | Monga |
| 2010/0225443 A1 | 9/2010 | Bayram et al. |
| 2011/0055907 A1 | 3/2011 | Narasimhan et al. |
| 2011/0070864 A1 | 3/2011 | Karam et al. |
| 2011/0082911 A1 | 4/2011 | Agnoni et al. |
| 2011/0145587 A1 | 6/2011 | Park |
| 2011/0251951 A1 | 10/2011 | Kolkowitz et al. |
| 2011/0298753 A1 | 12/2011 | Chuang et al. |
| 2012/0041683 A1 | 2/2012 | Vaske et al. |
| 2012/0124662 A1 | 5/2012 | Baca et al. |
| 2012/0127102 A1 | 5/2012 | Uenohara et al. |
| 2012/0151553 A1 | 6/2012 | Burgess et al. |
| 2013/0071816 A1 | 3/2013 | Singh et al. |
| 2013/0117246 A1 | 5/2013 | Cabaniols et al. |
| 2013/0231974 A1 | 9/2013 | Harris et al. |
| 2013/0254115 A1 | 9/2013 | Pasa et al. |
| 2013/0339141 A1 | 12/2013 | Stibel et al. |
| 2014/0006347 A1 | 1/2014 | Qureshi et al. |
| 2014/0067656 A1 | 3/2014 | Cohen et al. |
| 2014/0149130 A1 | 5/2014 | Getchius |
| 2014/0366159 A1 | 12/2014 | Cohen |
| 2015/0039473 A1 | 2/2015 | Hu et al. |
| 2015/0220509 A1 | 8/2015 | Karov Zangvil et al. |
| 2015/0254308 A1 * | 9/2015 | Scott ...................... G06F 16/23 |
| | | 707/780 |
| 2015/0264573 A1 | 9/2015 | Giordano et al. |
| 2015/0348041 A1 | 12/2015 | Campbell et al. |

(56) References Cited

U.S. PATENT DOCUMENTS

| | | | |
|---|---|---|---|
| 2016/0041984 | A1 | 2/2016 | Kaneda et al. |
| 2016/0352759 | A1 | 12/2016 | Zhai |
| 2017/0039219 | A1 | 2/2017 | Acharya et al. |
| 2017/0068954 | A1 | 3/2017 | Hockey et al. |
| 2017/0070500 | A1 | 3/2017 | Hockey et al. |
| 2017/0154382 | A1 | 6/2017 | McLaughlin et al. |
| 2017/0163664 | A1 | 6/2017 | Nagalla et al. |
| 2017/0177743 | A1 | 6/2017 | Bhattacharjee et al. |
| 2017/0300911 | A1 | 10/2017 | Alnajem |
| 2018/0107944 | A1 | 4/2018 | Lin et al. |
| 2018/0349924 | A1 | 12/2018 | Shah et al. |
| 2018/0357434 | A1* | 12/2018 | Roy .................. G06F 21/6209 |
| 2019/0014101 | A1 | 1/2019 | Hockey et al. |
| 2019/0182233 | A1 | 6/2019 | Hockey et al. |
| 2019/0197189 | A1 | 6/2019 | Studnicka |
| 2019/0228411 | A1 | 7/2019 | Hernandez-Ellsworth et al. |
| 2019/0318122 | A1 | 10/2019 | Hockey et al. |
| 2019/0347281 | A1 | 11/2019 | Natterer |
| 2019/0349371 | A1 | 11/2019 | Smith et al. |
| 2019/0373001 | A1 | 12/2019 | Deeb et al. |
| 2020/0019964 | A1 | 1/2020 | Miller et al. |
| 2020/0117800 | A1 | 4/2020 | Ramberg et al. |
| 2020/0279275 | A1 | 9/2020 | Kelly et al. |
| 2021/0049326 | A1 | 2/2021 | Amend et al. |
| 2021/0110447 | A1 | 4/2021 | Ransom et al. |

FOREIGN PATENT DOCUMENTS

| | | | |
|---|---|---|---|
| EP | 2653982 | A1 | 10/2013 |
| EP | 2636149 | A4 | 10/2016 |
| IL | 176551 | A | 9/2012 |
| IN | 219405 | | 3/2007 |
| KR | 10-0723738 | B1 | 5/2007 |
| TW | 201723907 | A | 7/2017 |
| WO | 01/25914 | A2 | 4/2001 |
| WO | 02/87124 | A1 | 10/2002 |
| WO | 2002/100039 | A2 | 12/2002 |
| WO | 03/73724 | A2 | 9/2003 |
| WO | 2005/067209 | A1 | 7/2005 |
| WO | 2012/061701 | A1 | 5/2012 |
| WO | 2014/145395 | A2 | 9/2014 |
| WO | 2015/175824 | A1 | 11/2015 |
| WO | 2017/096206 | A1 | 6/2017 |
| WO | 2017/209799 | A1 | 12/2017 |
| WO | 2018/022157 | A1 | 2/2018 |

OTHER PUBLICATIONS

Banon, Shay, "Geo Location and Search", elastic blog post, Aug. 16, 2010, webpage found at https://www.elastic.co/blog/geo-location-and-search on Oct. 15, 2019.

Bansal, Nikhil, Avrim Blum, and Shuchi Chawla. "Correlation clustering." Machine Learning 56.1-3 (2004): 89-113.

Bottomline Technologies (de), Inc, "'4 Steps to Bringing a Positive ROI to Accounts Payable", 2019, a white paper downloaded from https://go.bottomline.com/rs/498-XVR-738/images/4-Steps-Bringing-Positive-ROI-AP-IOFM-FDX-US-WTP-1802-088.pdf on Sep. 30, 2019.

Bottomline Technologies, Bottomline Cyber Fraud & Risk Management:Secure Payments, marketing brochure.

Brasetvik, Alex, "Elasticsearch from the Bottom up, Part 1", Elastic, Sep. 16, 2013. Webpage found at https://www.elastic.co/blog/found-elasticsearch-from-the-bottom-up on Jun. 17, 2019.

Co-pending U.S. Appl. No. 13/135,507, filed Jul. 7, 2011.

Dalit Amitai, Shahar Cohen, Yulia Mayer, and Avital Seraty, "Fraud Detection Rule Optimization", U.S. Appl. No. 16/985,773, filed Aug. 5, 2020.

EMV Payment Tokenisation Specification, Technical Framework, EMVCo, LLC, Version 2.1, Jun. 2019.

EMV Payment Tokenisation, a Guide to Use Cases, EMVCo, LLC, Version 1.0, Jun. 2019.

Ephesoft, "KV Extraction Normalization", webpage downloaded from https://ephesoft.com/docs/2019-1/moduleplugin-configuration/extraction-module/key-value-extraction-4040/key-value-extraction-plugin/kv-extraction-normalization/on Oct. 1, 2019.

Experian, "Fuzzy address searching", webpage downloaded from https://www.edq.com/glossary/fuzzy-address-searching/ on Oct. 8, 2019.

Fenz, Dustin, et al, "Efficient Similarity Search in Very Large String Sets", conference paper, Jun. 2012.

Finley, Thomas, and Thorsten Joachims. "Supervised clustering with support vector machines." Proceedings of the 22nd international conference on Machine learning, ACM, 2005.

G. Kou, Y. Peng, Y. Shi, M. Wise, W. Xu, Discovering credit cardholders behavior by multiple criteria linear programming, Annals of Operations Research 135, (2005) 261-274.

Haydn Shaughnessy, Solving the $190 billion Annual Fraud Problem: More on Jumio, Forbes, Mar. 24, 2011.

Holl, Xavier and Andrew Chisholm, "Extracting structured data from invoices", Proceedings of Australasian Language Technology Association Workshop, 2018, pp. 53-59.

IdentityMing, Accelerated Fintech Compliance and Powerful Online Fraud Prevention Tools, website found at https://identitymindglobal.com/momentum/ on Dec. 12, 2018.

International Search Report and Written Opinion received for PCT Patent Application No. PCT/IL05/000027, dated Jun. 2, 2005, 8 pages.

International Search Report and Written Opinion received for PCT Patent Application No. PCT/US17/13148, dated May 19, 2017, 11 pages.

Jeremy Olshan, How my bank tracked me to catch a thief, MarketWatch, Apr. 18, 2015.

Krawetz, N., "Looks Like It", 2011. Downloaded from from:http://www.hackerfactor.com/blog/index.php?/archives/432-Looks-Like-It.html on May 27, 2020.

Lada, Dr. Maria, "Combined Search and Examination Report", UK Intellectual Property Office, May 18, 2020.

Meia et al., Comparing clusterings—an information based distance, Journal of Multivariate Analysis 98 (2007) 873-895.

Mitchell, Stuart, et al, "pulp Documentation", Release 1.4.6, Jan. 27, 2010.

Oracle(Registered) Warehouse Builder Data Modeling, ETL, and Data Quality Guide, Chapter 23, 11g Release 2 (11.2), Part No. E10935-04, Aug. 2011, web page downloaded from https://docs.oracle.com/cd/E24693_01/owb.11203/e10935/match_merge.htm on Apr. 16, 2020.

Postel et al.; "Telnet Protocol Specification" RFC 854; entered into the case on Apr. 18, 2013.

RodOn, "location extraction with fuzzy matching capabilities", Blog post on StackOverflow.com, Jul. 8, 2014, webpage downloaded from https://stackoverflow.com/questions/24622693/location-extraction-with-fuzzy-matching-capabilities on Oct. 8, 2019.

Rosette Text Analytics, "An Overview of Fuzzy Name Matching Techniques", Blog, Dec. 12, 2017, webpage downloaded from https://www.rosette.com/blog/overview-fuzzy-name-matching-techniques/ on Oct. 15, 2019.

Samaneh Sorournejad, Zahra Zojaji, Reza Ebrahimi Atani, Amir Hassan Monadjemi, "A Survey of Credit Card Fraud Detection Techniques: Data and Technique Oriented Perspective", 2016.

Schulz, Klaus and Stoyan Mihov, "Fast String Correction with Levenshtein-Automata", IJDAR (2002) 5: 67. https://doi.org/10.1007/s10032-002-0082-8.

Segers, Jens, "Perceptual image hashes", Dec. 13, 2014, webpage downloaded from https://jenssegers.com/perceptual-image-hashes on Sep. 27, 2019.

Sypht, "Unlock the value of your information", webpage downloaded from https://www.sypht.com/index.html on Sep. 27, 2019.

The Telnet Protocol Microsoft Knowledgebase; entered into the case on Apr. 18, 2013.

Vogler, Raffael, "Comparison of String Distance Algorithms", Aug. 21, 2013, webpage downloaded on Oct. 20, 2020 from https://www.joyofdata.de/blog/comparison-of-string-distance-algorithms.

Wikil Kwak, Yong Shi, John J. Cheh, and Heeseok Lee, "Multiple Criteria Linear Programming Data Mining Approach: An Applica- (56) References Cited

OTHER PUBLICATIONS tion for Bankruptcy Prediction", : Data Mining and Knowledge Management, Chinese Academy of Sciences Symposium, 2004, LNAI 3327, pp. 164-173, 2004.
Wikipedia, "Autoencoder", web page downloaded from http://en.wikipedia.org/wiki/Autoencoder on Dec. 18, 2020.
Wikipedia, "Damerau-Levenshtein distance", webpage downloaded on Oct. 20, 2020 from https://en.wikipedia.org/wiki/Damerau-Levenshtein_distance.
Wikipedia, "Reverse image search", Sep. 12, 2019. Downloaded from: https://en.wikipedia.org/w/index.php?title=Reverse_image_search&oldid=915372427 on May 27, 2020.
Written Opinion of the International Searching authority for corresponding International Application No. PCT/US2016/064689 dated Feb. 22, 2017.
"Splink: Probabilistic record linkage and deduplication at scale", Python Software Foundation, webpage downloaded from https://pypi.org/project/splink/ on Jun. 1, 2021.
"Save time on monthly reconciliations with QuickBooks.", Intuit Quickbooks, webpage downloaded from https://quickbooks.intuit.com/accounting/bank-reconciliation/ on Jun. 1, 2021.
Sadinle, Mauricio, et al, "Approaches to Multiple Record Linkage", ISI 2011 invited paper, 2011.
Winkler, William, et al, "An Application of the Fellegi-Sunter Model of Record Linkage to the 1990 U.S. Decennial Census", US Census working paper No. RR91-09, 1991.
"Record Linkage", Wikipedia, webpage downloaded on Jun. 3, 2021 from https://en.wikipedia.org/wiki/Record_linkage.
Fellegi, Ivan and Alan Sunter, "A Theory for Record Linkage", Journal of the American Statistical Association, Dec. 1969, vol. 64, No. 328, pp. 1183-1210.
Enamorado, Ted, et al, "Using a Probabilistic Model to Assist Merging of Large-Scale Administrative Records", American Political Science Review, 2019, vol. 113, No. 2, pp. 353-371.
Tiziana Tuoto, "Method: Fellegi-Sunter and Jaro Approach to Record Linkage", a section in Memobust Handbook on Methodology of Modern Business Statistics, Mar. 26, 2014.

* cited by examiner

PROCESS FOR AUTOMATICALLY MATCHING DATASETS

BACKGROUND

Prior Application

This is a priority application.

Technical Field

The present disclosure relates generally to computer algorithms for matching records in a data set, specifically using data enrichment and triaging to optimize performance.

Description of the Related Art

There are many situations where a record needs to be found in a different dataset. An address read from an envelope needs to be matched to a postal database to determine the proper routing channels. Or in a network, a MAC address from a network packet needs to be found in a database to determine the physical location of the device that sent the message. In still another situation, a death record needs to be located in the roles of registered voters. In each case, the record may be formatted differently than in the dataset. The data in the record may be slightly different than the data in the dataset. Does the imperfect data match?

These questions also arise in the reconciliation of checks with banking records, or with payments received to open invoices or purchase orders to approved payments. There are numerous situations where the matching of imperfect data is required.

Current approaches to matching imperfect data are slow and inefficient, particularly with large datasets. The performance issue is particularly acute in scenarios where thousands of matches are needed in a day or hour. An improvement is needed. The apparatuses and methods described below articulate an optimized solution to the matching of imperfect data.

SUMMARY OF THE INVENTIONS

This document describes a non-transitory computer readable media programmed to enrich an entered record submitted to be matched with a dataset record stored on a data storage device. The enrichment is done by supplementing data in the entered record with customer data from a dataset. The media is further programmed to search through a plurality of dataset records in the dataset for the entered record. The search is programmed to first determine if the entered record unambiguously matches one of the dataset records or if the entered record unambiguously does not match one of the dataset records. If the entered record does not unambiguously match one of the dataset records, score match characteristics using a Fellegi-Sunter algorithm, save the score as a highest score if the score is above the highest score less a threshold, and save a location of one of the dataset records as a matching record if the score is above a previous highest score. Next, tune a Fellegi-Sunter algorithm parameter with the data from the entered record and data from one of the dataset records; and when the dataset records have been checked, return the matching record.

The dataset record could be a payment record and the media could be further programmed to enrich at least one payment record by supplementing data in at least one payment record with the customer data from the dataset. The dataset record could be an invoice record and the media could be further programmed to enrich at least one invoice record by supplementing data in at least one invoice record with the customer data from the dataset. The entered record could be related to a payment or an invoice. The threshold could be zero. The Fellegi-Sunter algorithm parameter could be a probability m that an amount field in the entered record matches an amount field in the dataset record. The Fellegi-Sunter algorithm parameter could be a probability n that a customer address field in the entered record does not match a customer address field in the dataset record.

A method is also described here. The method is made up of the steps of (1) enriching, with a computer, an entered record submitted to be matched with a dataset record on a data storage device by supplementing data in the entered record with customer data from a dataset, (2) searching through a plurality of dataset records in the dataset for the entered record, wherein the searching first determines if the entered record unambiguously matches one of the dataset records or if the entered record unambiguously does not match one of the dataset records, (3) if the entered record does not unambiguously match one of the dataset records, (3a) scoring match characteristics using a Fellegi-Sunter algorithm, (3b) saving the score as the highest score if the score is above the highest score, less a threshold, and (3c) saving a location of the one of the dataset records as a matching record if the score is above a previous highest score. The method continues by (4) tuning a Fellegi-Sunter algorithm parameter with the data from the entered record and data from one of the dataset records, and (5) when the dataset records have been checked, returning the matching record.

The dataset record could be a payment record and the method could also include (2a) enriching at least one payment record by supplementing data in at least one payment record with the customer data from the dataset. The dataset record could be an invoice record and the method could also include (2a) enriching at least one invoice record by supplementing data in at least one invoice record with the customer data from the dataset. The entered record could be related to a payment or an invoice. The threshold could be zero. The Fellegi-Sunter algorithm parameter could be a probability m that an amount field in the entered record matches an amount field in the dataset record. The Fellegi-Sunter algorithm parameter could be a probability n that a customer address field in the entered record does not match a customer address field in the dataset record.

BRIEF DESCRIPTION OF THE DRAWINGS

The annexed drawings, which are not necessarily to scale, show various aspects of the inventions in which similar reference numerals are used to indicate the same or similar parts in the various views.

DETAILED DESCRIPTION

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present disclosure provides several embodiments for matching records in a dataset where both the record and the dataset are made up of imperfect data. Many data applications rely on multiple data sources, merging data sets is an essential part of researchers' workflow. Unfortunately, a unique identifier that unambiguously links records is often unavailable, and data may contain missing and inaccurate information. These problems are severe especially when merging large-scale administrative records.

Figure 1:
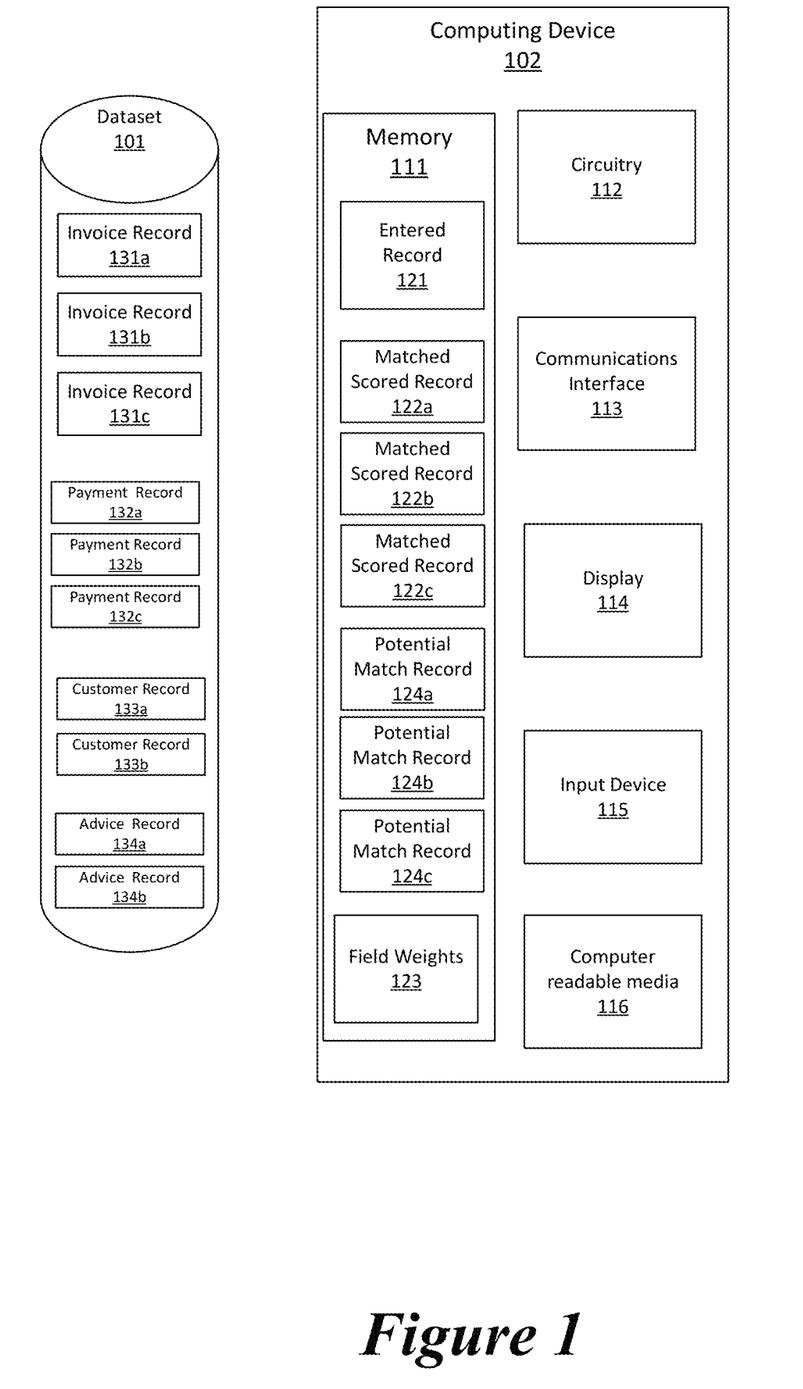
FIG. 1 is one possible hardware implementation of the present inventions.

Starting with FIG. 1, a dataset 101 is located on a data storage device such as a disk drive, a RAID server, an optical drive, a memory device, a solid-state drive, or a similar device. The dataset 101 could be organized as a database, a set of files, a spreadsheet, a data structure, or similar. The dataset 101 includes a number of dataset records 131a-c, 132a-c, 133a-b, 134a-b. The dataset records 131a-c, 132a-c, 133a-b, 134a-b could be organized as a plurality of delimiter (comma, space, carriage return, etc) separated fields, fixed sized fields, free format text capable of being parsed into fields, or other data structures. These data records 131a-c, 132a-c, 133a-b, 134a-b contain the reference data that is being compared against. The data records 131a-c, 132a-c, 133a-b, 134a-b could be, but are not necessarily cleaned, and could contain misspelled words, a mix of spelled out and abbreviated words, nicknames and full names, missing fields, information in the wrong field, and other anomalies that prevent exact matches. The dataset 101 is not necessarily deduplicated.

In some embodiments, the dataset 101 contains a set of outstanding invoices I, 131a-c representing all of the receivables for a company. The payments P, 132a-c received by the company are also stored in the dataset 101. The customer records C, 133a-b for the company are also stored in the dataset 101, as are the advice records A, 134a-b. Some of these records are linked, perhaps using pointers in memory for example. When an invoice I, 131a-c is entered, it may be linked to a customer account C, 133a-b. Payments P, 132a-c may contain advice information A, 134a-b. With the match described herein, the payment P, 132a-c is linked with an invoice I, 131a-c.

The dataset 101 interfaces with a computing device 102. This interface could be a direct bus connection, a local area network connection, an optical link, a wireless communications interface, or similar. The computing device 102 includes circuitry 112 such as a microprocessor and various interface and power circuitry. The computing device 102 also includes a communications interface 113 for interfacing the computing device 102 to networks such as the internet, local area networks, wireless networks, optical networks. The communications interface 113 could be a component of the interface with the dataset 101. In some embodiments, the computing device 102 also includes a display 114 (such as an LED screen, a CRT monitor, a LED monitor, an LCD or laser projector, etc.) and/or an input device 115 (such as a keyboard, mouse, touchscreen, touchpad, check reader, license plate reader, credit card scanner, driver's license scanner, passport scanner, etc). The computing device 102 also includes or interfaces to computer readable media 116.

The computing device includes memory 111 that connects to the circuitry 112, the communications interface 113, and perhaps to the display 114, the computer readable media 116, and the input device 115. The memory 111 could include the computer readable media 116.

The memory 111 contains the entered record 121 (a payment P or an invoice I) that is being searched for to match. It also includes the matched, scored records 122a-c that hold the match score, potential matched records 124a-c, and record (payment P or invoice I) in the dataset 101 for the records that appear to be a match. Further, the memory 111 includes the field weights 123 that are tuned parameters for calculating the score, such as m and u discussed below).

Figure 2:
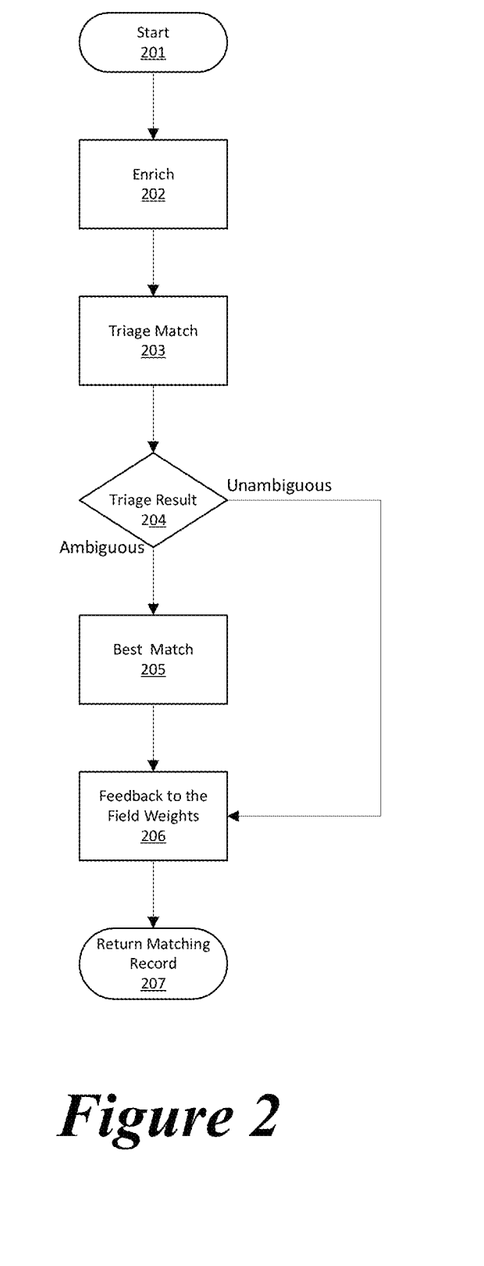
FIG. 2 is a flow chart of the steps to reconcile the record with the dataset.

FIG. 2 is a flowchart of the algorithm for determining a match between a payment and an invoice that begins 201 with the entering of the record 121 (either a payment or an invoice) to find a match. Next, the record is enriched with existing data 202. The stored payments and invoices are also enriched. The enrichment is described in FIG. 4.

Once the data is enriched, the data is triaged to see if a quick, unambiguous match between payment and invoice can be found 203. This process is outlined in detail in FIG. 5.

If the triage result 204 is unambiguous then proceed to processing the feedback 206.

Figure 6:
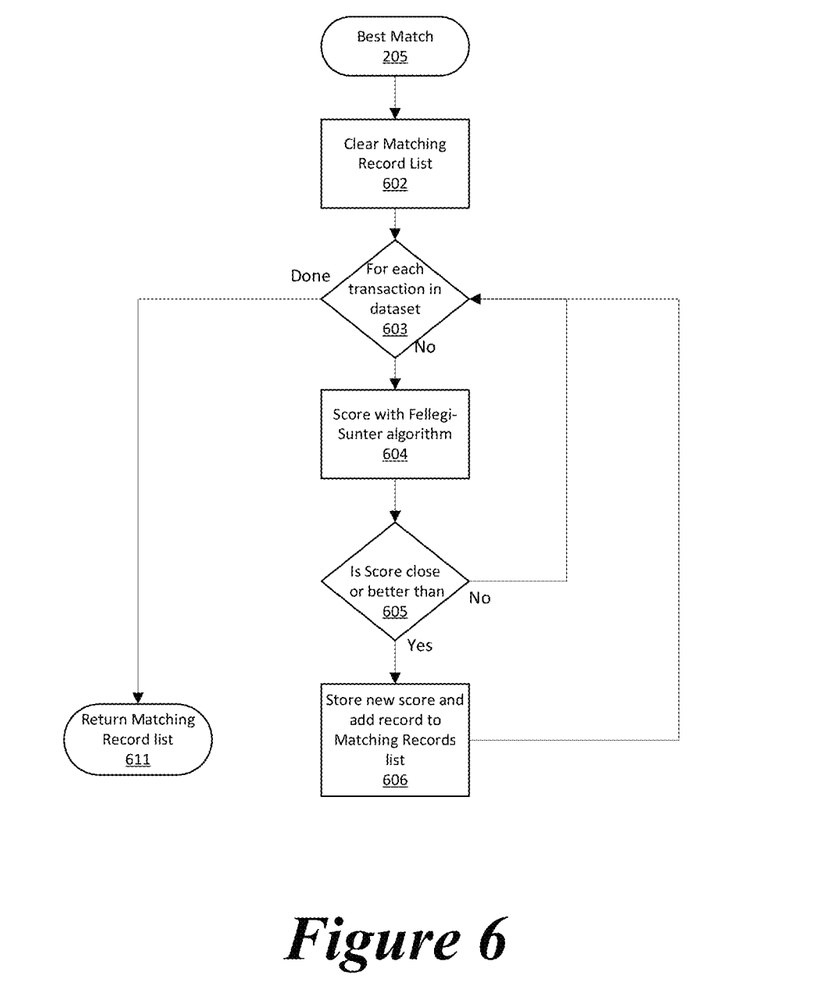
FIG. 6 is a flow chart of the best match process.

If the triage result 204 is ambiguous, then additional processing is needed to identify the best match 205. The best match 205 algorithm is shown in FIG. 6. Once the best match is identified, then feedback 206 is provided.

The feedback 206 adjusts the parameters used in the best match 205 algorithm. For instance, parameters u and m may be adjusted to tune the Fellegi-Sunter algorithm. Other parameters may be adjusted as well.

Once the feedback 206 algorithm has adjusted the parameters, the matching record could be returned 207 to the calling routine, if a matching record is found. If a match is not found, a null pointer may be returned in some embodiments. In other embodiments, a second parameter is returned indicating whether a match was found. In still other embodiments, a score indicating the confidence of the match is returned.

Figure 3:
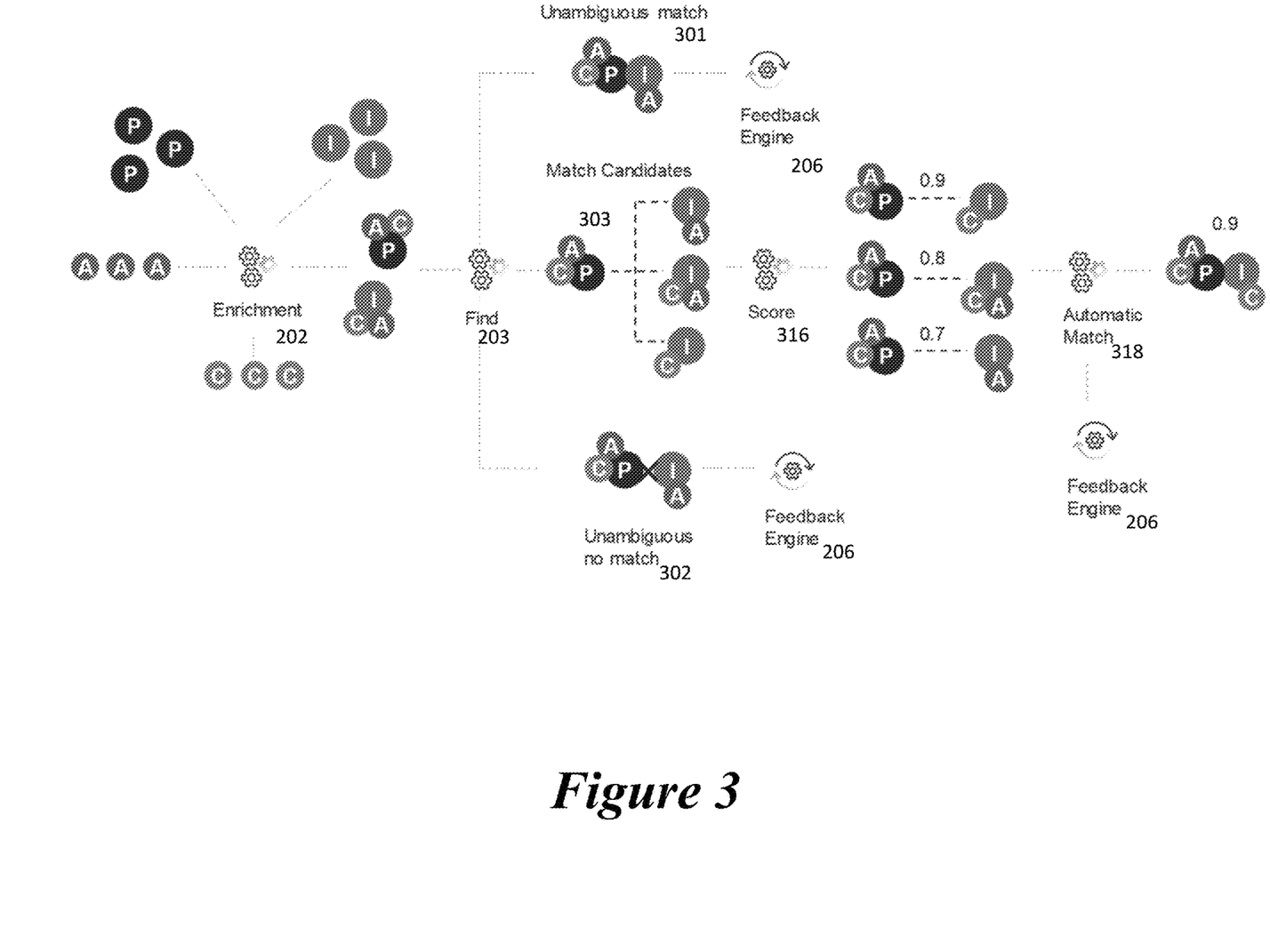
FIG. 3 is a data flow view of the reconciliation process.

FIG. 3 shows a data flow through the system described herein. The enrichment process 202 takes invoice information I, payment information P, advice information A, and customer information C. The advice A is information about the data, such as an unstructured email response to a question about a payment. For example, a payment may arrive without any information, and an accounts receivable clerk may send an email asking about which invoice the payment is related to. The returned email may be one example of advice A.

The enrichment process 202 matches information from advice A and customers C with payments P or with invoices I to form enriched payments P,A,C or enriched invoices I,C,A. This combination is then sent through the find, or triage match 203 to see if a quick match can be made between the enriched payments P,A,C and an enriched invoice I,C,A (or any invoice I). The triage match 203 may also be run to match an enriched invoice I,C,A to a stored payment P (or an enriched payment P,A,C).

There are three possible results of the triage match 202: the match could be unambiguous, with the invoice I (or enhanced invoice I,C,A) clearly matching the enriched payment P,A,C) 301, or there could be an unambiguous mismatch 302, or the match could be ambiguous 303, with a plurality of match candidates.

When there is an unambiguous match 301, then the enriched invoice I,C,A (or the invoice itself I) is linked to the enriched payment P,A,C (or the payment P). The process is complete, the match is made. Once matched, the feedback engine 206 is run to update the parameters used in the scoring and fuzzy matching.

When there is an unambiguous mismatch 302, then no link is made. The process is complete, the match is not made. No invoices I are found that match the payment P (or no payment P is found to match the invoice I). The feedback engine 206 is run to update the parameters used in the scoring and fuzzy matching.

When the match is ambiguous 303, then each of the potential match candidate invoices I,A; I,C,A; I,C are scored 316 against the match with the payment P,A,C. Then the automatic match process 318 determines which match scored the highest, and the match between the invoice I and the payment P, and the link between the invoice I and the payment P is established. The feedback engine 206 is run to update the parameters used in the scoring and fuzzy matching.

Figure 4:
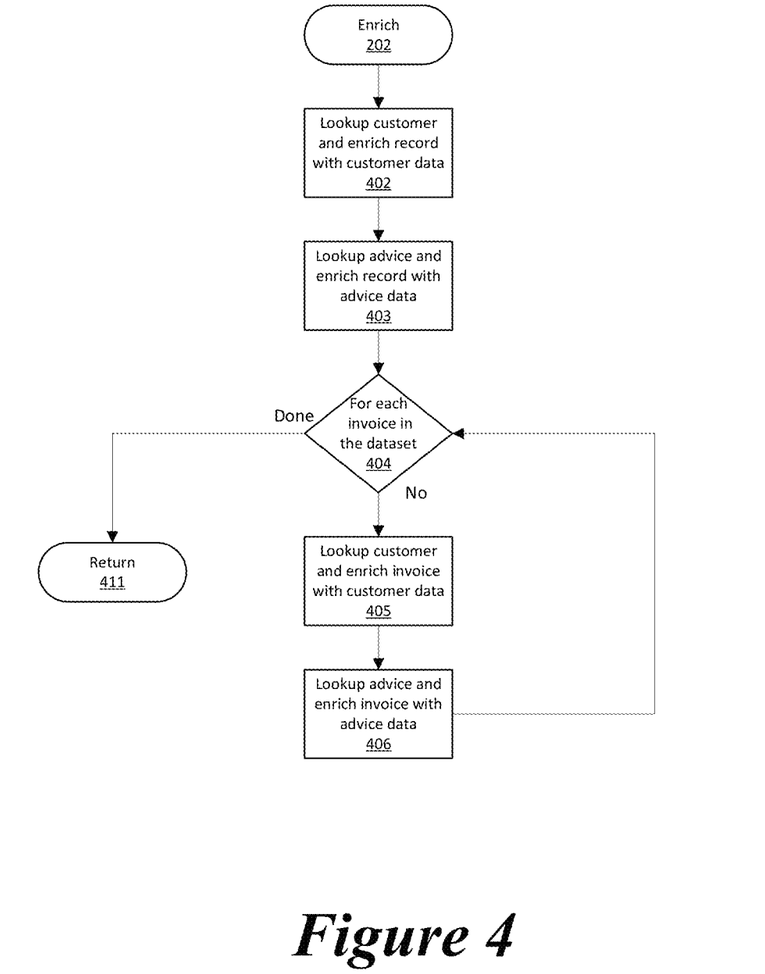
FIG. 4 is a flow chart of the enrichment process.

FIG. 4 shows the details of the enrichment process 202. This process begins by enhancing the information 402 in the entered record 121, In one embodiment, the entered record has payment information P. If there is missing customer information in the entered record 121, then the customer information C is looked up in the customer records 133a-b in the dataset 101. Any missing contact information from the customer record 133a-b is copied into (enriched) 402 the entered record 121. Any other missing information is filled in if it is easily accessible. In some embodiments, a search is done by customer name to find the customer record 133a-b. In other embodiments, the customer number is used as an index to find the customer record 133a-b.

If there is additional missing information in the entered record 121, then the advice information A is looked up in the customer records 133a-b in the dataset 101. Any missing information from the advice record 134a-b is copied into (enriched) 403 the entered record 121. Any other missing information is filled in if it is easily accessible. The advice record 134a-b could be found with a search or a lookup.

The enrichment process 202 then continues looking at every invoice in the dataset 404. Each invoice 131a-c is analyzed to see if it is missing customer information C. If so, then the invoice 131a-c in the dataset 101 is enriched 405 by filling in missing data from customer data 133a-b. In some embodiments, this enrichment is done by linking the invoice 131a-c with the customer record 133a-b. Each invoice 131a-c is also analyzed to see if it is missing other information. If so, then the invoice 131a-c in the dataset 101 is enriched 406 by filling in missing data from advice data 134a-b. In some embodiments, this enrichment is done by linking the invoice 131a-c with the advice record 134a-b.

See Table 1 for an example of the parameters for an enrichment. The Property is the field of the invoice record 131a-c, the identifier is the type of field, the disqualify is used by the triage match 203 to determine if the match of the field needs to be absolute or if it is optional. The unique check says whether the field is unique. And the ambiguous field determines if the match is unambiguous if the field matches.

TABLE 1

| Field | Identifier | Disqualify identifier if NO_MATCH | Unique check (for automatic match) | Unambiguous check (for automatic matching) |
|---|---|---|---|---|
| TransactionReference | Transaction | false | false | false |
| CustomerReference | Counter-Party | true | false | false |
| CustomerName | Counter-Party | true | false | false |
| InvoiceNumber | Invoice | true | false | true |
| CustomerName | Counter-Party | true | false | false |
| TransactionDate | Date | false | false | false |
| Amount | Amount | true | true | false |
| . . . | . . . | . . . | . . . | . . . |

In some embodiments, the payment records 132a-c are also enriched similarly.

Once all of the invoices 132a-c have been enriched, the process ends and returns to the calling routine 411.

In some embodiments, the enrichment 202 process continuously watches (as a background process) for new advice A and customers C and tries to link new information with payments P or invoices I in the system. Once a link is established between the new advice A or the new customer C, the properties in the invoices I or payments P are associated with the new advice A or new customer C populated automatically.

Figure 5:
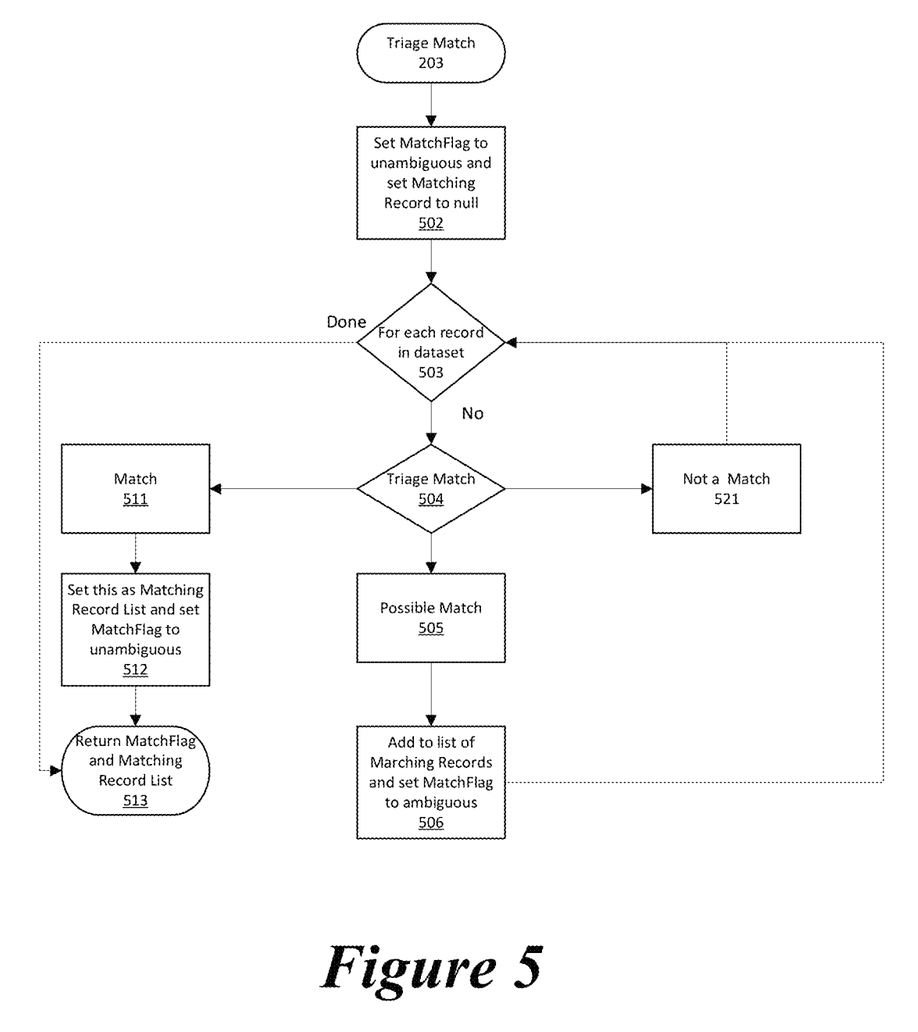
FIG. 5 is a flow chart of the triage matching process.

FIG. 5 shows the details of the triage match process 203. A payment record 121 is passed to the triage match process 203, with the goal to find a matching invoice I. This process also could be used to find payments P if the passed parameter 121 is an invoice. This process begins by initializing the variables for the search 502. The MatchFlag is set to Unambiguous and the MatchingRecordList is set to null.

For each invoice 131a-c in the dataset 101, the incoming record 121 is checked against the next invoice 131a-c. This triage match 504 is a simple comparison of the data in the two records. If it matches completely (in some embodiments, the match is not complete, but requires a match of certain fields, or alternatively, a match of a certain number of fields), then there is a complete match 511. If none of the information matches (in some embodiments, the mismatch is not complete, but requires a mismatch of certain fields, or alternatively, a mismatch of a certain number of fields), then there is no match 521. If some of the information matches, then there is a possible match 505. In some embodiments, the possible match 505 is determined if there is neither a match 511 nor a not a match 521, then a possible match 505 is determined for all other cases.

If there is no match 521, the loop checks the next 503 invoice in the dataset 101.

If there is a possible match 505, then the invoice 13 1a-c from the dataset 101 is added 506 to the list of possible matches 124a-c. The MatchFlag is set to ambiguous. And then the invoice 131a-c in the list is checked 503.

If there is a match 511, then the MatchFlag is set to unambiguous 512, as we found the matching invoice I, and the invoice 132a-c is copied to the head of the linked list of potentially matched records 124a. This copying is done to clear the list of matches and replace it with the one matched record 124a. The loop checking all records in the list is terminated, and the routine returns 513 the Match Flag and the list of potential matching records 124a.

Once the entire list of invoices 131*a-c* is checked 503, the MatchFlag and the list of potential matching records 124*a-c* are returned 513.

Looking to FIG. 6, the detailed process of identifying the best match 205 is shown. The best match process 205 takes the entered record 121 and a list of potential matches 124*a-c* as parameters and attempts to find the best match by scoring each match using the Fellegi-Sunter algorithm. The Fellegi-Sunter algorithm is described in "A Theory for Record Linkage" by Ivan P. Fellegi and Alan B. Sunter (*Journal of the American Statistical Association*, American Statistical Association, December 1969, Vol. 64, No. 328, pp. 1183-1210), incorporated herein by reference. The best scoring record 122*a-c* is returned. In some embodiments, additional matches within a threshold distance to the best score are also returned.

The best match process 205 may start by clearing the matching record list 602, initializing this list, and setting the BestScore value to 0. Next, the list of potential matches 124*a-c* are processed one record by one 603, first scoring the match between the potential match record with the entered record 121. In some embodiments, the entered record 121 is a payment P, and the potential match list 124*a-c* is a list of invoices I. In another embodiment, the entered record 121 is an invoice I, and the potential match list 124*a-c* is a list of payments P.

In one embodiment, the match is scored with the Fellegi-Sunter algorithm 604. The score is compared with the BestScore 605, and if the score is better than the BestScore, then the BestScore is assigned the value of the score 606. And the matching record from 124*a-c* is saved in the matched scored record list 122*a-c*. The score is within a threshold of the BestScore, then the matching record from 124*a-c* is saved in the matched scored record list 122*a-c* but the BestScore is not changed. Then the next record in the potential match list 124*a-c* is checked. Once all of the records in the potential match list 124*a-c* have been checked, the matched scored record list 122*a-c* is returned to the calling routine 611. In some embodiments, only the best scoring record is returned, and no threshold analysis is performed.

The best match process is called when there is a possible match 303, 505. Some of the fields may match but others may be missing or misspelled. The match is scored 216 to see how close the record 131*a*, 131*b*, 131*c* in the dataset 101 matches incoming record 121.

The Fellegi-Sunter algorithm compares the similarity of two records. This comparison is done on a field by field basis (aka level by level), calculating the probability that the field matches and a probability that the field does not match. The probabilities are then summed to determine a match score.

Fellegi and Sunter algorithm considers the binary comparison vector $$\gamma_k = \begin{cases} 1 & \text{if } X_k^A = X_k^B \\ 0 & \text{otherwise} \end{cases}$$

For an observed comparison vector $\gamma$, the space of all comparison vectors, $m(\gamma)$ is defined to be the conditional probability of observing $\gamma$ given that the record pair is a true match: in formula $m(\gamma)=P((a, b) \in M)$. Similarly, $u(\gamma)= P((a, b) \in U)$ denotes the conditional probability of observing $\gamma$ given that the record pair is a true non-match.

There are two kinds of possible misclassification errors: false matches and false non-matches. The probability of false matches is:

$$\mu = P(M^*|M) = \Sigma u(\gamma)P(M^*|\gamma)$$

and the probability of a false non-match is:

$$\lambda = P(U^*|M) = \Sigma m(\gamma)P(U^*|\gamma)$$

The Fellegi-Sunter scoring uses the Bayes theorem to calculate a probability that the records match. For instance, the probability that we have found a true match, given that we observed this particular level (e.g. probability of true match given that emails matched exactly), is calculated. Observed patterns can be used to generate a probability of if a new record comparison is a true match or not.

For the purpose of initializing the scoring algorithm, we define the types of matches for a level (Entity name in this example):

TABLE 2

| Type of match | Entity name (invoice) | Entity name (payment) |
| --- | --- | --- |
| Different | Emerald Bank | Ruby Inc |
| Similar | Emerald Bank | Emerald Inc |
| Exact | Emerald Bank | Emerald Bank |

These different fields are referred to as levels. A user can use as many levels as they want and can define. The algorithm discovers which rules (levels) are most important for distinguishing between possible matches and non-matches. Rule (level) importance is quantified by the m/u ratio, where a higher m/u ratio means that rule is more important for determining if a comparison is a true match.

The Bayes theorem is:

$$P(\text{True Match} \mid \text{Level}) = \frac{m_{kl} * \lambda}{m_{kl} * \lambda + u_{kl} * (1 - \lambda)}$$

Where $\gamma$ indicates the value of the comparison, the index k designates the comparison column, and l designates the observed comparison level. P(TrueMatch Level) is the estimated prior probability that any comparison between a pair of records is a match. For instance, it is the probability that the cell at the column and level is a true match.

At the core of this estimation are the m and u probabilities (m and u are part of the field weights 123). Here, m is the fraction of true matches for a given level and u is the fraction of non-matches for a given level. For instance, the m probability for level 2 (where emails exactly match) is the fraction of true matches having identical emails in both the invoice and payment tables.

If the level is a high similarity comparison (e.g. Emails match exactly), we expect a high m probability, because we would expect true matches to almost always have the same email (except for typos or missing entries). The u probability represents the chance that a non-match has a high similarity level in that column. (e.g. two different people share the same email by pure chance). We would expect First Name to have a higher u probability than Social Security Number, since there is more chance of two people sharing the same first name than social security number.

In reality, we don't have any knowledge of which records are true matches when we start the matching process. This means we don't know m or u and can't make any predictions. So, we begin with an educated guess (e.g. m=0.9, u=0.2 for a level) and use the expectation maximization algorithm (based on the feedback 206) to converge on values of m and u which best fit the patterns in the data. It is also possible to use domain knowledge to set initial values of m and u.

The expectation maximization algorithm begins by estimating m, u (or manually choose these) for each column and level. Next, it computes the probability that each record comparison is a match/non-match (using Bayes Theorem). Then, the expectation maximization algorithm uses these probabilities to assign all the comparisons to predicted match/non-match. Next, the algorithm uses these predicted matches to calculate a new m, u. Finally, the algorithm iterates until m and u converge. As a result, we have a model which knows how each level of comparison influences the probability of a record being a match or a non-match.

It should be appreciated that many of the elements discussed in this specification may be implemented in a hardware circuit(s), a circuitry executing software code or instructions which are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. A non-transitory computer readable media programmed to:
enrich an entered record submitted to be matched with a dataset record stored on a data storage device by supplementing data in the entered record with customer data from a dataset;
search through a plurality of dataset records in the dataset for the entered record, wherein the search is programmed to first determine if the entered record unambiguously matches one of the dataset records or if the entered record unambiguously does not match the one of the dataset records;
determine if the entered record does not unambiguously match the one of the dataset records;
score match characteristics using a Fellegi-Sunter algorithm;
save the score as a highest score if the score is above the highest score less a threshold;
save a location of the one of the dataset records as a matching record if the score is above a previous highest score;
tune a Fellegi-Sunter algorithm parameter with the data from the entered record and data from the one of the dataset records; and
when the dataset records have been checked, return the matching record.

2. The non-transitory computer readable media of claim 1 wherein the dataset record is a payment record.

3. The non-transitory computer readable media of claim 2 further programmed to enrich at least one payment record by supplementing data in the at least one payment record with the customer data from the dataset.

4. The non-transitory computer readable media of claim 1 wherein the dataset record is an invoice record.

5. The non-transitory computer readable media of claim 4 further programmed to enrich at least one invoice record by supplementing data in the at least one invoice record with the customer data from the dataset.

6. The non-transitory computer readable media of claim 1 wherein the entered record is related to a payment.

7. The non-transitory computer readable media of claim 1 wherein the entered record is related to an invoice.

8. The non-transitory computer readable media of claim 1 wherein the threshold is zero.

9. The non-transitory computer readable media of claim 1 wherein the Fellegi-Sunter algorithm parameter is a probability m that an amount field in the entered record matches an amount field in the dataset record.

10. The non-transitory computer readable media of claim 1 wherein the Fellegi-Sunter algorithm parameter is a probability n that a customer address field in the entered record does not match a customer address field in the dataset record.

11. A method comprising:
enriching, with a computer, an entered record submitted to be matched with a dataset record on a data storage device by supplementing data in the entered record with customer data from a dataset;
searching through a plurality of dataset records in the dataset for the entered record, wherein the searching first determines if the entered record unambiguously matches one of the dataset records or if the entered record unambiguously does not match the one of the dataset records;
determining if the entered record does not unambiguously match the one of the dataset records;
scoring match characteristics using a Fellegi-Sunter algorithm;
saving the score as a highest score if the score is above the highest score, less a threshold;
saving a location of the one of the dataset records as a matching record if the score is above a previous highest score;

tuning a Fellegi-Sunter algorithm parameter with the data from the entered record and data from the one of the dataset records; and when the dataset records have been checked, returning the matching record.

12. The method of claim 11 wherein the dataset record is a payment record.

13. The method of claim 12 further comprising enriching at least one payment record by supplementing data in the at least one payment record with the customer data from the dataset.

14. The method of claim 11 wherein the dataset record is an invoice record.

15. The method of claim 14 further comprising enriching at least one invoice record by supplementing data in the at least one invoice record with the customer data from the dataset.

16. The method of claim 11 wherein the entered record is related to a payment.

17. The method of claim 11 wherein the entered record is related to an invoice.

18. The method of claim 11 wherein the threshold is zero.

19. The method of claim 11 wherein the Fellegi-Sunter algorithm parameter is a probability m that an amount field in the entered record matches an amount field in the dataset record.

20. The method of claim 11 wherein the Fellegi-Sunter algorithm parameter is a probability n that a customer address field in the entered record does not match a customer address field in the dataset record.

* * * * *